United States Patent
Liu et al.

(10) Patent No.: US 12,503,107 B2
(45) Date of Patent: Dec. 23, 2025

(54) INTERACTION BETWEEN HOST VEHICLE AND TARGET VEHICLE

(71) Applicant: Ford Global Technologies, LLC, Dearborn, MI (US)

(72) Inventors: Yuhao Liu, Canton, MI (US); Christopher Pontisakos, Allen Park, MI (US); Alex Maurice Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 18/346,905

(22) Filed: Jul. 5, 2023

(65) Prior Publication Data

US 2025/0033633 A1    Jan. 30, 2025

(51) Int. Cl.
*B60W 10/18* (2012.01)
*B60W 10/20* (2006.01)
*B60W 30/095* (2012.01)
*B60W 40/072* (2012.01)

(52) U.S. Cl.
CPC ........ *B60W 30/0956* (2013.01); *B60W 10/18* (2013.01); *B60W 10/20* (2013.01); *B60W 40/072* (2013.01); *B60W 2720/14* (2013.01)

(58) Field of Classification Search
CPC .. B60W 30/0956; B60W 10/18; B60W 10/20; B60W 40/072; B60W 2720/14; B60W 2520/10; B60W 2520/14; B60W 2554/806; B60W 30/09; B60W 10/04; B60W 10/184
USPC ...................................... 701/1–2, 16, 22, 23
See application file for complete search history.

(56) References Cited

U.S. PATENT DOCUMENTS

| | | | |
|---|---|---|---|
| 10,759,422 B2 | 9/2020 | You | |
| 11,580,859 B1 * | 2/2023 | Aine | ................. G08G 1/167 |
| 2016/0071417 A1 | 3/2016 | Lewis et al. | |
| 2016/0159353 A1 * | 6/2016 | Yun | ................. B60W 10/06 |
| | | | 701/93 |
| 2017/0018186 A1 * | 1/2017 | Probert | ........... G08G 1/096716 |
| 2017/0154529 A1 * | 6/2017 | Zhao | ....................... G08G 1/07 |
| 2017/0247028 A1 * | 8/2017 | Goudy | ................ B60W 30/095 |
| 2017/0369067 A1 * | 12/2017 | Saigusa | ................. B60W 30/16 |

(Continued)

FOREIGN PATENT DOCUMENTS

CN    112601686 A    4/2021

OTHER PUBLICATIONS

"Integrated Vehicle-Based Safety Systems (IVBSS) Light Vehicle Field Operational Test Independent Evaluation," U.S. Department of Transportation, National Highway Traffic Safety Administration, Oct. 2011, 156 pages.

*Primary Examiner* — B M M Hannan
(74) *Attorney, Agent, or Firm* — Frank A. MacKenzie; Brooks Kushman P.C.

(57) ABSTRACT

A computer includes a processor and a memory, and the memory stores instructions executable by the processor to determine a host kinematic state of a host vehicle, determine a target kinematic state of a target vehicle, determine a quantity characterizing an intersection of a host path of the host vehicle and a target path of the target vehicle, and actuate a component of the host vehicle based on the quantity. The host path is based on the host kinematic state, and the target path is based on the target kinematic state. At least one of the host path or the target path is curved.

16 Claims, 7 Drawing Sheets

(56) References Cited

U.S. PATENT DOCUMENTS

| | | | |
|---|---|---|---|
| 2018/0033304 A1* | 2/2018 | Damiani | G05D 1/0289 |
| 2018/0079420 A1* | 3/2018 | Aine | B60W 30/16 |
| 2018/0099663 A1* | 4/2018 | Diedrich | B60W 40/072 |
| 2018/0181820 A1* | 6/2018 | Ide | G08G 1/167 |
| 2019/0291728 A1* | 9/2019 | Shalev-Shwartz | G01S 17/86 |
| 2021/0070289 A1* | 3/2021 | Yu | G06V 20/588 |
| 2021/0072757 A1* | 3/2021 | Shapira | G05D 1/0278 |
| 2021/0094577 A1* | 4/2021 | Shalev-Shwartz | B60W 30/0953 |
| 2021/0162995 A1* | 6/2021 | Shalev-Shwartz | B60W 40/107 |
| 2021/0191406 A1* | 6/2021 | Shalev-Shwartz | B60W 40/105 |
| 2021/0272018 A1 | 9/2021 | Casas et al. | |
| 2022/0250612 A1* | 8/2022 | Wang | G06V 20/58 |
| 2023/0005364 A1* | 1/2023 | Walter | B60W 30/0956 |
| 2023/0005374 A1* | 1/2023 | Elimaleh | G08G 1/065 |
| 2023/0032132 A1* | 2/2023 | Reshef | B60W 60/001 |
| 2023/0127230 A1* | 4/2023 | Molnar | B60W 40/12 701/23 |
| 2024/0359740 A1* | 10/2024 | Saigo | B62D 15/025 |

\* cited by examiner

INTERACTION BETWEEN HOST VEHICLE AND TARGET VEHICLE

BACKGROUND

Advanced driver assistance systems (ADAS) are electronic technologies that assist drivers in driving and parking functions. Examples of ADAS include forward collision detection, lane-departure detection, blind-spot detection, automatic braking, adaptive cruise control, and lane-keeping assistance systems.

DETAILED DESCRIPTION

Figure 1:
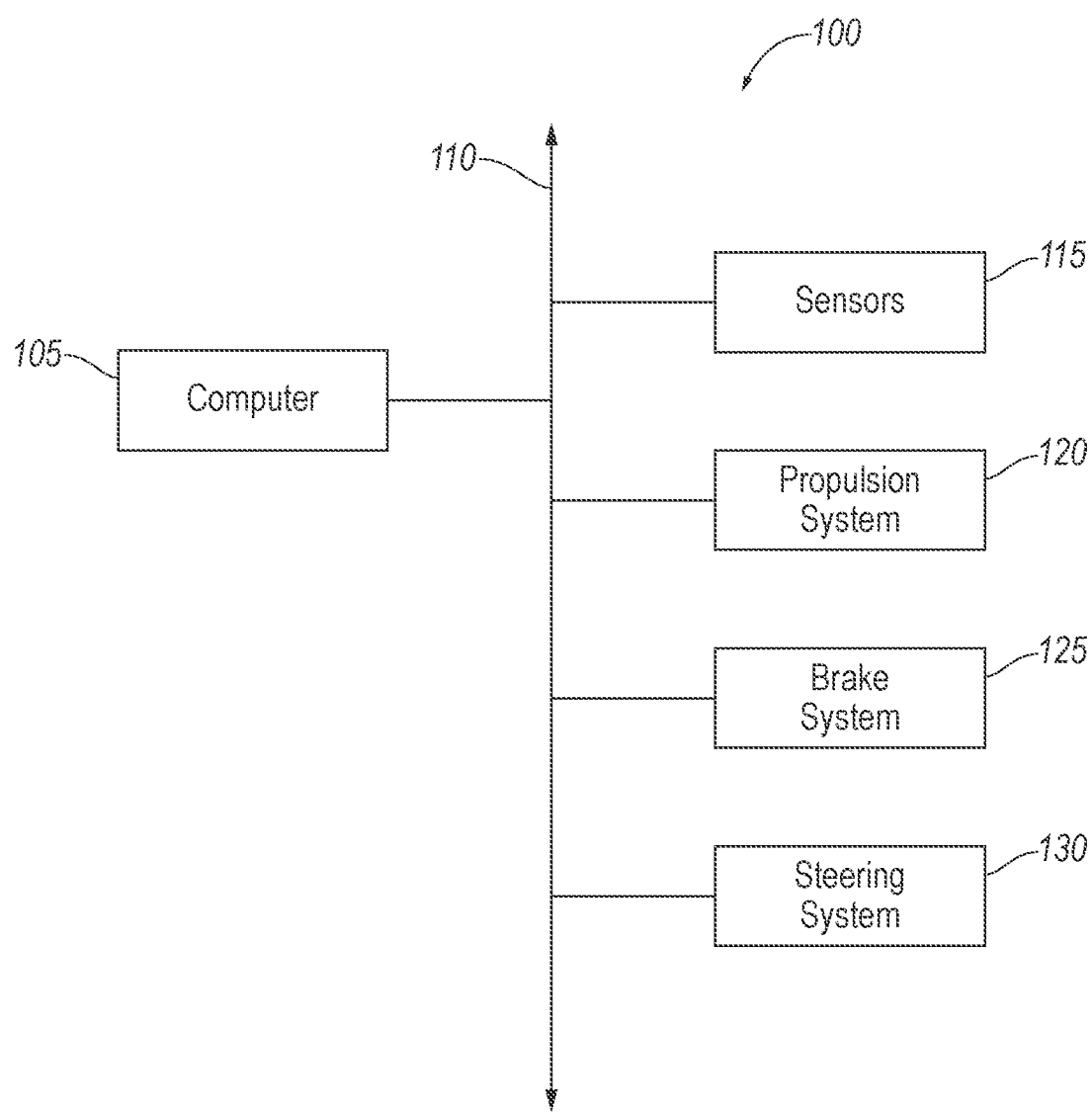
FIG. 1 is a block diagram of an example host vehicle.

This disclosure describes techniques for determining when to actuate a host vehicle in the presence of a target vehicle. A computer of the host vehicle is programmed to determine kinematic states of the host vehicle and the target vehicle, determine a quantity characterizing an intersection of the paths of the host vehicle and target vehicle, and actuate a component of the host vehicle based on the quantity. The paths of the host vehicle and target vehicle are based on the respective kinematic states, and at least one path is curved. Because the kinematic states are used to determine the paths, the computer may rely on sensor data, e.g., radar data, that is generally available on board the host vehicle, rather than map data or vehicle-to-vehicle (V2V) communications, which may be unavailable or more difficult to access. Treating one or both of the paths as curved may account for additional scenarios in which the host vehicle may be actuated to brake or steer, compared with automated braking that relies on a distance to an object in front of the host vehicle.

A computer includes a processor and a memory, and the memory stores instructions executable by the processor to determine a host kinematic state of a host vehicle, determine a target kinematic state of a target vehicle, determine a quantity characterizing an intersection of a host path of the host vehicle and a target path of the target vehicle, and actuate a component of the host vehicle based on the quantity. The host path is based on the host kinematic state, and the target path is based on the target kinematic state. At least one of the host path or the target path is curved.

In an example, the component may include at least one of a brake system and a steering system.

In an example, the host path and the target path may be based only on the host kinematic state and target kinematic state.

In an example, the host path may be curved. In a further example, the instructions may further include instructions to determine a radius of curvature of the host path based on a rate of change of the radius of curvature. In a yet further example, the radius of curvature may be a sum of an instantaneous radius of curvature and a term including the rate of change of the radius of curvature. In a still yet further example, the instantaneous radius of curvature may be a quotient of a velocity of the host vehicle and a yaw rate of the host vehicle.

In another yet further example, the radius of curvature of the host path may be based on a product of a prestored gain and the rate of change of the radius of curvature.

In another further example, the instructions may further include instructions to determine a radius of curvature of the host path, and determine a time for the target vehicle to enter the host path based on the radius of curvature.

In another further example, the instructions may further include instructions to determine a radius of curvature of the host path, and determine a time for the target vehicle to exit the host path based on the radius of curvature.

In an example, the target path may be curved. In a further example, the instructions may further include instructions to determine a distance from the host vehicle to the target path based on a rate of change of a relative heading angle between the host vehicle and the target vehicle.

In another further example, the instructions may further include instructions to determine a lateral distance to shift the target path from a straight-line path such that the target path does not intersect the host path from a current position of the host vehicle through a braking distance of the host vehicle.

In an example, the host path may be curved, and the target path may be curved. In a further example, the quantity may be a target yaw acceleration of the target vehicle. In a yet further example, the instructions may further include instructions to determine the target yaw acceleration based on a radius of curvature of the host path. In a still yet further example, the instructions may further include instructions to determine a target yaw rate of the target vehicle that maintains a minimum distance between the target vehicle and the host path having the radius of curvature, and determine the target yaw acceleration based on the target yaw rate.

In another yet further example, the instructions may further include instructions to determine the target yaw acceleration based on a relative lateral velocity between the host vehicle and the target vehicle.

In another yet further example, the instructions may further include instructions to determine the target yaw acceleration based on a quotient of a desired change in a target yaw rate of the target vehicle and a time for the target vehicle to enter the host path following a straight line.

A method includes determining a host kinematic state of a host vehicle, determining a target kinematic state of a target vehicle, determining a quantity characterizing an intersection of a host path of the host vehicle and a target path of the target vehicle, and actuating a component of the host vehicle based on the quantity. The host path is based on the host kinematic state, and the target path is based on the target kinematic state. At least one of the host path or the target path is curved.

With reference to the Figures, wherein like numerals indicate like parts throughout the several views, a computer 105 includes a processor and a memory, and the memory stores instructions executable by the processor to determine a host kinematic state of a host vehicle 100, determine a target kinematic state of a target vehicle 300, determine a quantity characterizing an intersection of a host path 305 of the host vehicle 100 and a target path 310 of the target vehicle 300, and actuate a component of the host vehicle 100 based on the quantity. The host path 305 is based on the host kinematic state, and the target path 310 is based on the target kinematic state. At least one of the host path 305 or the target path 310 is curved.

With reference to FIG. 1, the host vehicle 100 may be any passenger or commercial automobile such as a car, a truck, a sport utility vehicle, a crossover, a van, a minivan, a taxi, a bus, etc. The host vehicle 100 may include the computer 105, a communications network 110, sensors 115, a propulsion system 120, a brake system 125, and a steering system 130.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 110. The communications network 110 may be, e.g., a controller area network (CAN) bus, Ethernet, WiFi, Local Interconnect Network (LIN), onboard diagnostics connector (OBD-II), and/or any other wired or wireless communications network. The computer 105 may be communicatively coupled to the sensors 115, the propulsion system 120, the brake system 125, the steering system 130, and other components via the communications network 110.

The sensors 115 may provide data about operation of the host vehicle 100, for example, wheel speed, wheel orientation, and engine and transmission data (e.g., temperature, fuel consumption, etc.). The sensors 115 may detect the location and/or orientation of the host vehicle 100. For example, the sensors 115 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 115 may detect the external world, e.g., objects and/or characteristics of surroundings of the host vehicle 100, such as the target vehicle 300, road lane markings, traffic lights and/or signs, pedestrians, etc. For example, the sensors 115 may include radar sensors, ultrasonic sensors, scanning laser range finders, light detection and ranging (lidar) devices, and image processing sensors such as cameras.

The propulsion system 120 of the host vehicle 100 generates energy and translates the energy into motion of the host vehicle 100. The propulsion system 120 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 120 can include an electronic control unit (ECU) or the like that is in communication with and receives input from the computer 105 and/or a human operator. The human operator may control the propulsion system 120 via, e.g., an accelerator pedal and/or a gear-shift lever.

The brake system 125 is typically a conventional vehicle braking subsystem and resists the motion of the host vehicle 100 to thereby slow and/or stop the host vehicle 100. The brake system 125 may include friction brakes such as disc brakes, drum brakes, band brakes, etc.; regenerative brakes; any other suitable type of brakes; or a combination. The brake system 125 can include an electronic control unit (ECU) or the like that is in communication with and receives input from the computer 105 and/or a human operator. The human operator may control the brake system 125 via, e.g., a brake pedal.

The steering system 130 is typically a conventional vehicle steering subsystem and controls the turning of the wheels of the host vehicle 100. The steering system 130 may be a rack-and-pinion system with electric power-assisted steering, a steer-by-wire system, as both are known, or any other suitable system. The steering system 130 can include an electronic control unit (ECU) or the like that is in communication with and receives input from the computer 105 and/or a human operator. The human operator may control the steering system 130 via, e.g., a steering wheel.

With reference to FIGS. 3 and 5-7, the host vehicle 100 and the target vehicle 300 may be located in a same environment, e.g., driving on the same street or intersecting streets. The host vehicle 100 is the vehicle under the control of the computer 105, for which the determinations and actuations below are described. The target vehicle 300 is not under the control of the computer 105.

The computer 105 is programmed to determine the host kinematic state of the host vehicle 100 and the target kinematic state of the target vehicle 300. For the purposes of this disclosure, a "kinematic state" is defined as a set of one or more variables specifying motion of an object through space, e.g., one or more of position, velocity, acceleration, jerk, orientation, angular velocity, angular acceleration, etc. The computer 105 may determine the host kinematic state based on data from the sensors 115, e.g., data from a GPS sensor and/or IMUs. The computer 105 may determine the target kinematic state based on data from the sensors 115, e.g., data from radars and/or lidars over time, using object-tracking algorithms as are known.

The computer 105 is programmed to determine the host path 305. The host path 305 is a projected path of the host vehicle 100 as the host vehicle 100 travels from a current position of the host vehicle 100. The host path 305 may be based on the host kinematic state. For example, the host path 305 may be based on the host kinematic state and the target kinematic state; e.g., the host path 305 may incorporate an anticipated maneuver reacting to the target vehicle 300. The host path 305 may be based only on the host kinematic state and the target kinematic state. The computer 105 may thus determine the host path 305 without needing map data or a planned route. The techniques herein are thus applicable when the host vehicle 100 is under the control of a human operator, i.e., not being driven autonomously, and a planned route is not known. The host path 305 may be curved.

The computer 105 is programmed to determine the target path 310. The target path 310 is a projected path of the target vehicle 300 as the target vehicle 300 travels from a current position of the target vehicle 300. The target path 310 may be based on the target kinematic state. For example, the target path 310 may be based on the host kinematic state and the target kinematic state; e.g., the target path 310 may incorporate an anticipated maneuver reacting to the host vehicle 100. The target path 310 may be based only on the host kinematic state and the target kinematic state. The computer 105 may thus determine the target path 310 without needing map data or vehicle-to-vehicle (V2V) communications from the target vehicle 300. The target path 310 may be curved.

The computer 105 may determine the host path 305 and target path 310 according to the techniques described below with respect to the specific examples of FIGS. 3 and 5-7. The computer 105 may determine one host path 305 and target path 310 or multiple host paths 305 and target paths 310, e.g., according to a subset or all of the examples of FIGS. 3 and 5-7. The computer 105 may select the techniques for determining the host path 305 and target path 310 based on whether the host vehicle 100 and/or the target vehicle 300 are turning. For example, the computer 105 may determine the host path 305 and target path 310 according to the techniques of FIG. 3 in response to the host vehicle 100 turning (i.e., the host path 305 being curved) and the target vehicle 300 either turning or traveling straight. The computer 105 may determine the host path 305 and target path 310 according to the techniques of FIG. 5 and according to the techniques of FIG. 6 in response to the target vehicle 300 turning (i.e., the target path 310 being curved) and the host vehicle 100 either turning or traveling straight. The computer 105 may determine the host path 305 and the target path 310 according to the techniques of FIG. 7 in response to both the host vehicle 100 turning and the target vehicle 300 turning.

The host path 305 and the target path 310 intersect. The host vehicle 100 may have a position along the host path 305 at which the host vehicle 100 enters the target path 310, e.g., at which a portion of the host vehicle 100 first crosses the target path 310. The host vehicle 100 may have a position along the host path 305 at which the host vehicle 100 exits the target path 310, e.g., at which a last portion of the host vehicle 100 leaves the target path 310. The target vehicle 300 may have a position along the target path 310 at which the target vehicle 300 enters the host path 305, e.g., at which a portion of the target vehicle 300 first crosses the host path 305. The target vehicle 300 may have a position along the target path 310 at which the target vehicle 300 exits the host path 305, e.g., at which a last portion of the target vehicle 300 leaves the host path 305.

The computer 105 is programmed to determine at least one quantity characterizing the intersection of the host path 305 of the host vehicle 100 and the target path 310 of the target vehicle 300. The quantity indicates some kinematic characteristic of the host vehicle 100 and/or the target vehicle 300 relative to the intersection of the host path 305 and the target path 310. For example, the quantity may indicate a distance of the host vehicle 100 (or target vehicle 300) from the target path 310 (or host path 305), a time for the host vehicle 100 (or target vehicle 300) to enter or exit the target path 310 (or host path 305), a lateral acceleration for the host vehicle 100 (or target vehicle 300) to turn away from the target path 310 (or host path 305), etc. The computer 105 may determine the quantity according to the techniques described below with respect to the specific examples of FIGS. 3 and 5-7.

The computer 105 may be programmed to actuate a component of the vehicle based on the quantity. For example, the computer 105 may compare the quantity to a threshold, actuate the component in response to the quantity exceeding the threshold, and refrain from actuating the component in response to the quantity not exceeding the threshold. For another example, the computer 105 may compare the quantity to one or more ranges, and actuate or refrain from actuating the component according to which range the quantity is within. The component may include the brake system 125 and/or the steering system 130. For example, the computer 105 may actuate the brake system 125 to slow the host vehicle 100 to a stop and/or actuate the steering system 130 to turn the host vehicle 100 away from the target path 310. When refraining from actuating the component, the computer 105 does not actuate the component as a result of the quantity, but the computer 105 may still actuate the component for a separate reason such as an input by the operator, e.g., pressing the brake pedal or turning the steering wheel.

Figure 2:
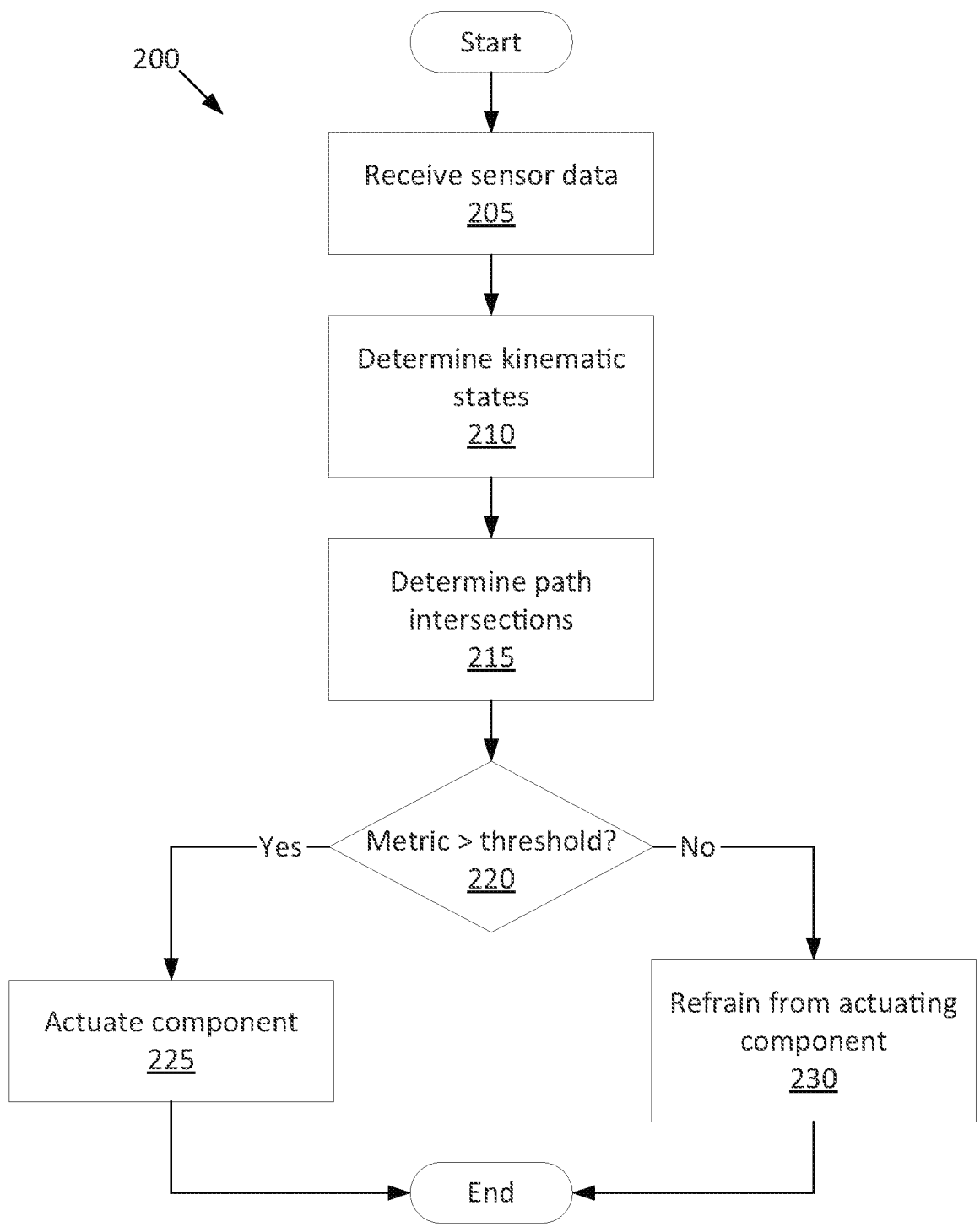
FIG. 2 is a flowchart of an example process for actuating the host vehicle based on the kinematic states of the host vehicle and a target vehicle.

FIG. 2 is a flowchart illustrating an example process 200 for actuating the host vehicle 100 based on the host kinematic state and target kinematic state. The memory of the computer 105 stores executable instructions for performing the steps of the process 200 and/or programming can be implemented in structures such as mentioned above. As a general overview of the process 200, the computer 105 receives data from the sensors 115, determines the host kinematic state and the target kinematic state, determines the intersections of the host path 305 and the target path 310, determines whether the quantity exceeds the threshold, actuates the component of the host vehicle 100 upon determining that the quantity exceeds the threshold, and refrains from actuating the component upon determining that the quantity does not exceed the threshold.

The process 200 begins in a block 205, in which the computer 105 receives data from the sensors 115, as described above.

Next, in a block 210, the computer 105 determines the host kinematic state of the host vehicle 100 and the target kinematic state of the target vehicle 300, as described above.

Next, in a block 215, the computer 105 determines the host path 305, the target path 310, and the intersections with the host path 305 and the target path 310, as described above and with specific examples below.

Next, in a decision block 220, the computer 105 determines the quantity/ies characterizing the intersection of the host path 305 and the target path 310, as described above and with specific examples below. In response to the quantity exceeding the threshold, the process 200 proceeds to a block 225. In response to the quantity not exceeding the threshold, the process 200 proceeds to a block 230.

In the block 225, the computer 105 actuates the component of the host vehicle 100, as described above. After the block 225, the process 200 ends.

In the block 230, the computer 105 refrains from actuating the component of the host vehicle 100, as described above. After the block 230, the process 200 ends.

Figure 3:
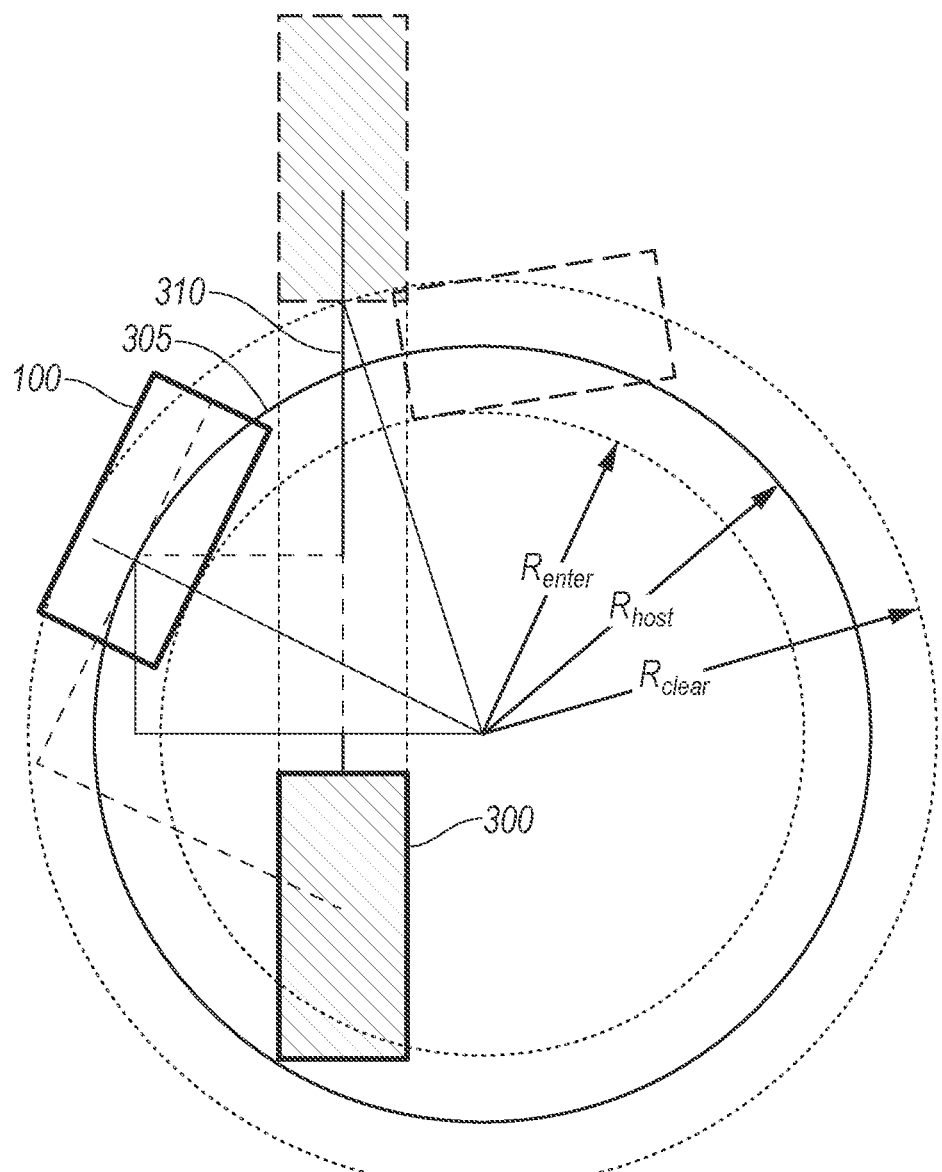
FIG. 3 is a diagrammatic top view of an example interaction between the host vehicle and the target vehicle.

With reference to FIG. 3, the computer 105 may be programmed to follow the steps of the example of FIG. 3 to determine the quantity characterizing the intersection of the host path 305 and the target path 310 in response to the host vehicle 100 turning and the target vehicle 300 approaching the host vehicle 100 from behind the host vehicle 100. The host path 305 is thus curved. The target vehicle 300 may be traveling straight or may be presumed to be traveling straight. The quantities characterizing the intersection may be the times for the target vehicle 300 to enter and exit the host path 305 and the time for the host vehicle 100 to enter the target path 310, determined as described below.

The computer 105 is programmed to determine a radius of curvature of the host path 305, e.g., based on a rate of change of the radius of curvature. The use of the rate of change of the radius of curvature provides a simple way to correct for a clothoid turn, which is a maneuver in which a vehicle follows a clothoid curve. A clothoid curve has a curvature that changes linearly with the length of the curve. Clothoid turns provide a smooth transition between traveling straight and turning. For example, the radius of curvature may be a sum of an instantaneous radius of curvature and a term including the rate of change of the radius of curvature. The instantaneous radius of curvature may be a quotient of a velocity of the host vehicle 100 and a yaw rate of the host vehicle 100. The other term may be a product of a prestored gain and the rate of change of the radius of curvature, e.g., as in the following equation:

$$R_{host} = \frac{v_{host}}{\omega_{host}} + k\dot{R}_{host}$$

in which $R_{host}$ is the radius of curvature of the host path 305, $v_{host}$ is the velocity of the host vehicle 100, $\omega_{host}$ is the yaw rate of the host vehicle 100, k is the prestored gain, and a dot above a variable indicates a time derivative of the variable. The prestored gain k may be chosen to provide sufficient responsiveness while maintaining accuracy, e.g., 0.1. The prestored gain k may be stored in the memory of the computer 105.

The computer 105 is programmed to determine times for the target vehicle 300 to enter and exit the host path 305 based on the radius of curvature $R_{host}$. For example, the computer 105 may determine a target entry time for a front end of the target vehicle 300 to cross an inner radius of the host path 305 and a target exit time for a rear end to cross an outer radius of the host path 305. The inner radius and outer radius may be the radius of curvature adjusted by the width of the host vehicle 100, as in the following equations:

$$R_{enter} = R_{host} - \frac{W_{host}}{2}$$

$$R_{clear} = R_{host} + \frac{W_{host}}{2}$$

in which $R_{enter}$ is the inner radius, $W_{host}$ is the width of the host vehicle 100, and $R_{clear}$ is the outer radius. The computer 105 may have the width $W_{host}$ stored in memory.

First, the computer 105 may determine a longitudinal distance and a lateral distance between the target vehicle 300 and the host vehicle 100 from the perspective of the target vehicle 300 based on a relative heading between the host vehicle 100 and the target vehicle 300 and a longitudinal distance and lateral distance from the perspective of the host vehicle 100, as in the following equations:

$$L_{long,target} = -[(L_{long,host} + L_{F2R})*\cos\theta + L_{lat,host}*\sin\theta]$$

$$L_{lat,target} = L_{lat,host}*\cos\theta - (L_{long,host} + L_{F2R})*\sin\theta$$

in which $L_{long,target}$ is the longitudinal distance relative to the target vehicle 300 between the target vehicle 300 and the host vehicle 100, $L_{long,host}$ is the longitudinal distance relative to the host vehicle 100 between the host vehicle 100 and the target vehicle 300, $L_{F2R}$ is the distance between the rear axle center and the front bumper center of the host vehicle 100, θ is the relative heading angle between the host vehicle 100 and the target vehicle 300, $L_{lat,host}$ is the lateral distance relative to the host vehicle 100 between the host vehicle 100 and the target vehicle 300, and $L_{lat,target}$ is the lateral distance relative to the target vehicle 300 between the target vehicle 300 and the host vehicle 100. The computer 105 may store the distance $L_{F2R}$ in memory. The computer 105 may determine the host distances $L_{long,host}$ and $L_{lat,host}$ and the relative heading angle θ based on data from the sensors 115, e.g., radar data.

Next, the computer 105 may determine an entry target lateral distance and an exit target lateral distance based on the target lateral distance $L_{lat,target}$, the relative heading angle θ, and the width of the target, as in the following equations:

$$L_{lat,targEnter} = L_{lat,target} - \frac{W_{target}}{2\cos\theta}$$

$$L_{lat,targClear} = L_{lat,target} + \frac{W_{target}}{2\cos\theta}$$

in which $L_{lat,targEnter}$ is the entry target lateral distance, $W_{target}$ is the width of the target vehicle 300, and $L_{lat,targClear}$ is the exit target lateral distance.

Next, the computer 105 may determine longitudinal distances for the target vehicle 300 to enter the host path 305 (i.e., first cross the inner radius $R_{enter}$) and exit the host path 305 (i.e., clear the outer radius $R_{clear}$) based on the entry and exit target lateral distances, e.g., as in the following equations:

$$L_{targEnter} = \frac{\sqrt{R_{enter}^2 - (R_{enter}\cos\theta + L_{lat,targEnter})^2} + L_{long,target} + R_{enter}}{\sin\theta}$$

$$L_{targClear} = \frac{\sqrt{R_{clear}^2 - (R_{clear}\cos\theta + L_{lat,targClear})^2} + L_{long,target} + R_{clear}}{\sin\theta}$$

in which $L_{targEnter}$ is the distance for the target vehicle 300 to travel to first cross the inner radius $R_{enter}$, and $L_{targClear}$ is the distance for the target vehicle 300 to travel to completely cross the outer radius $R_{clear}$.

Finally, the computer 105 may determine the time for the target vehicle 300 to enter the host path 305 using the longitudinal distance $L_{targEnter}$ to first cross the inner radius $R_{enter}$, and the computer 105 may determine the time for the target vehicle 300 to exit the host path 305 using the longitudinal distance $L_{targClear}$ to clear the outer radius $R_{clear}$, e.g., as in the following equations:

$$t_{targEnter} = \frac{L_{targEnter} - L_{targetLength}/2}{v_{target}}$$

$$t_{targClear} = \frac{L_{targClear} + L_{targetLength}/2}{v_{target}}$$

in which $t_{targEnter}$ is the time at which the target vehicle 300 enters the host path 305, $L_{targetLength}$ is the length of the target vehicle 300, $v_{target}$ is the speed of the target vehicle 300, and $t_{targClear}$ is the time at which the target vehicle 300 exits the host path 305. The computer 105 may determine the length $L_{targetLength}$ and the speed $v_{target}$ of the target vehicle 300 based on data from the sensors 115, e.g., from the radars.

The computer 105 is programmed to determine a time for the host vehicle 100 to enter the target path 310. First, the computer 105 may determine a velocity of the host vehicle 100, acceleration of the host vehicle 100, and lateral distance from the host vehicle 100 to the target vehicle 300, all converted to a coordinate system of the target vehicle 300. The computer 105 may multiply the terms by a rotation matrix to convert to the coordinate system of the target vehicle 300, e.g., as the in the following equations:

$$v_{host \to targ} = \begin{bmatrix} v_{long,host} & v_{lat,host} \end{bmatrix} \begin{bmatrix} \sin\theta(t) \\ \cos\theta(t) \end{bmatrix}$$

$$a_{host \to targ} = \begin{bmatrix} a_{long,host} & a_{lat,host} \end{bmatrix} \begin{bmatrix} \sin\theta(t) \\ \cos\theta(t) \end{bmatrix}$$

$$L_{lat,host \to targ} = \begin{bmatrix} L_{long,host} & -L_{lat,host} \end{bmatrix} \begin{bmatrix} \sin\theta(t) \\ \cos\theta(t) \end{bmatrix}$$

in which $v_{host \to targ}$ is the velocity of the host vehicle 100 in the coordinate system of the target vehicle 300, $v_{long,host}$ is the longitudinal component of the velocity of the host vehicle 100, $v_{lat,host}$ is the lateral component of the velocity of the host vehicle 100, $\theta(t)$ is the relative heading angle between the host vehicle 100 and the target vehicle 300 as a function of time, $a_{host \to targ}$ is the acceleration of the host vehicle 100 in the coordinate system of the target vehicle 300, $a_{long,host}$ is the longitudinal component of the acceleration of the host vehicle 100, $a_{lat,host}$ is the lateral component of the acceleration of the host vehicle 100, $L_{lat,host \to targ}$ is the lateral distance from the host vehicle 100 to the target vehicle 300 in the coordinate system of the target vehicle 300, $L_{long,host}$ is the longitudinal distance from the host vehicle 100 to the target vehicle 300, and $L_{lat,host}$ is the lateral distance from the host vehicle 100 to the target vehicle 300.

Next, the computer 105 determines the time when the distance between the host vehicle 100 and the target path 310 is zero, e.g., by solving for the time t in the following equation:

$$0.5 a_{host \to targ} t^2 + v_{host \to targ} t + L_{lat,host \to targ} = k * \left( \frac{W_{host}}{2} \cos\theta(t) + \frac{W_{target}}{2} \right)$$

in which k is an indicator of the lateral position of the target vehicle 300 relative to the host vehicle 100, $W_{host}$ is the width of the host vehicle 100, and $W_{target}$ is the width of the target vehicle 300. The indicator k equals 1 when the target vehicle 300 is to the right side of the host vehicle 100 and equals −1 when the target vehicle 300 is to the left side of the host vehicle 100. The time t is the time at which the host vehicle 100 enters the target path 310. For example, the computer 105 may use numerical approximation to solve for the time t.

The computer 105 is programmed to classify the interaction between the host vehicle 100 and the target vehicle 300 based on the times for the target vehicle 300 to enter and exit the host path 305 and the time for the host vehicle 100 to enter the target path 310, e.g., by using the times for the target vehicle 300 to enter and exit the host path 305 as the quantities characterizing the intersection and using the time for the host vehicle 100 to enter the target path 310 as the threshold (or vice versa). The computer 105 may classify the interaction as a miss in response to the time for the host vehicle 100 to enter the target path 310 occurring after the time for the target vehicle 300 to exit the host path 305. The computer 105 may classify the interaction as a near miss in response to a difference between the time for the host vehicle 100 to enter the target path 310 and the time for the target vehicle 300 to exit the host path 305 being less than a threshold. The threshold may be chosen based on a noise of the data from the sensors 115. The computer 105 may adjust the threshold based on an input by the operator, e.g., a selection of a driving mode. The computer 105 may classify the interaction as a potential front impact in response to the time for the host vehicle 100 to enter the target path 310 occurring between the time for the target vehicle 300 to enter the host path 305 and the time for the target vehicle 300 to exit the host path 305. The computer 105 may classify the interaction as a potential side impact in response to the time for the host vehicle 100 to enter the target path 310 occurring before the time for the target vehicle 300 to enter the host path 305.

The computer 105 may be programmed to determine a potential impact location on a side of the host vehicle 100 or target vehicle 300 according to the classification of the interaction. In response to classifying the interaction as a potential front impact, the computer 105 may determine a location along the side of the target vehicle 300, e.g., as a percentage of the length of the target vehicle 300, as in the following equation:

$$x_{target} = -\frac{L_{targEnter} - L_{targetLength}/2 - t_{hostEnter} v_{target}}{L_{targetLength}}$$

In response to classifying the interaction as a potential side impact, the computer 105 may determine a location along the side of the host vehicle 100, e.g., as a percentage of the length of the host vehicle 100, as in the following equation:

$$x_{host} = -\frac{(t_{hostEnter} - t_{targEnter}) R_{enter} \omega_{host}}{L_{hostLength}}$$

In response to classifying the interaction as a near miss, the computer 105 may determine a percentage of a length of the target vehicle 300 currently in the host path 305, e.g., as in the following equation:

$$x_{targetPath} = -\frac{L_{targClear} + L_{targetLength}/2 - t_{hostEnter} v_{target}}{L_{targetLength}}$$

The computer 105 may actuate a component of the host vehicle 100 based on the classification of the interaction, e.g., based on the potential impact location or length of the target vehicle 300 in the host path 305. For example, the computer 105 may select a component to actuate in order to navigate the host vehicle 100 around the target vehicle 300, e.g., with a smallest change to the direction and/or speed of the host vehicle 100, or according to some other criteria, for which the potential impact location or length of the target vehicle 300 in the host path 305 is an input.

Figure 4:
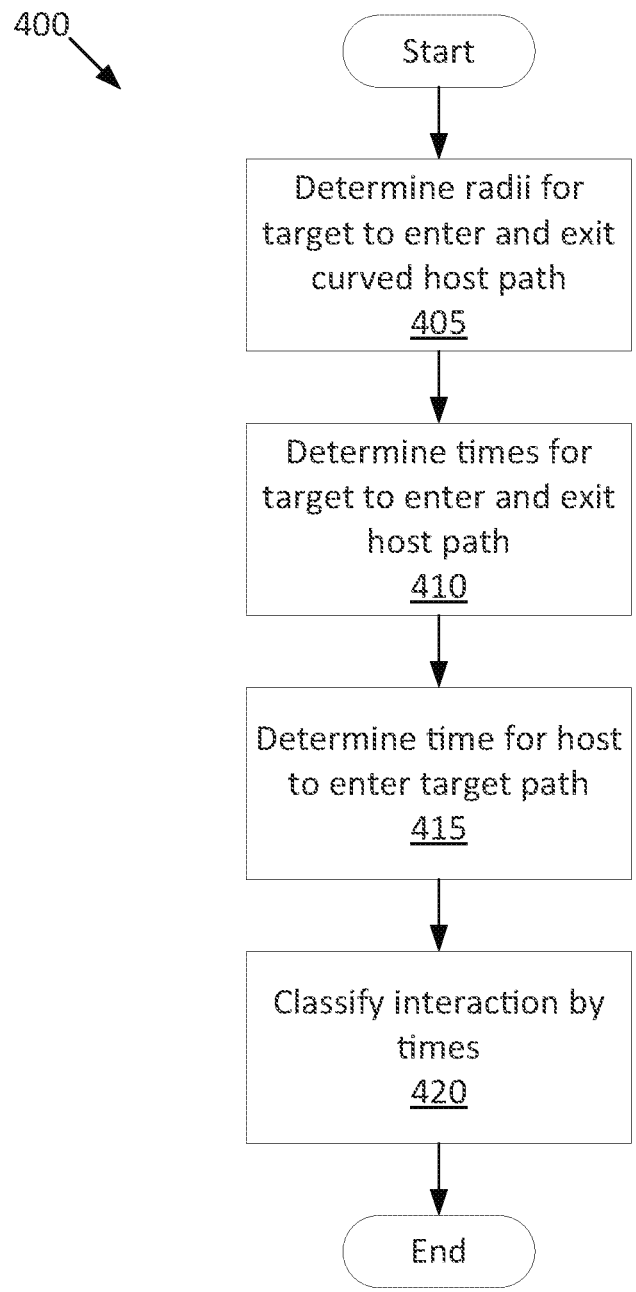
FIG. 4 is a flowchart of an example process for determining a metric for the interaction of FIG. 3.

FIG. 4 is a flowchart illustrating an example process 400 for determining the quantity, e.g., for the decision block 220 of the process 200, according to the example of FIG. 3. The memory of the computer 105 stores executable instructions for performing the steps of the process 400 and/or programming can be implemented in structures such as mentioned above. As a general overview of the process 400, the computer 105 determines the inner radius and outer radius of curvature of the host path 305, determines the times for the target vehicle 300 to enter and exit the host path 305, determines the time for the host vehicle 100 to enter the target path 310, and classifies the interaction between the host vehicle 100 and the target vehicle 300.

The process 400 begins in a block 405, in which the computer 105 determines the radius of curvature of the host path 305 and the inner radius and outer radius, as described above.

Next, in a block 410, the computer 105 determines a time for the target vehicle 300 to enter the host path 305 and to exit the host path 305 based on the radius of curvature, as described above.

Next, in a block 415, the computer 105 determines a time for the host vehicle 100 to enter the target path 310, as described above.

Next, in a block 420, the computer 105 classifies the interaction between the host vehicle 100 and the target vehicle 300, as described above. The computer 105 may further determine the potential impact location, as described above. After the block 420, the process 400 ends.

Figure 5:
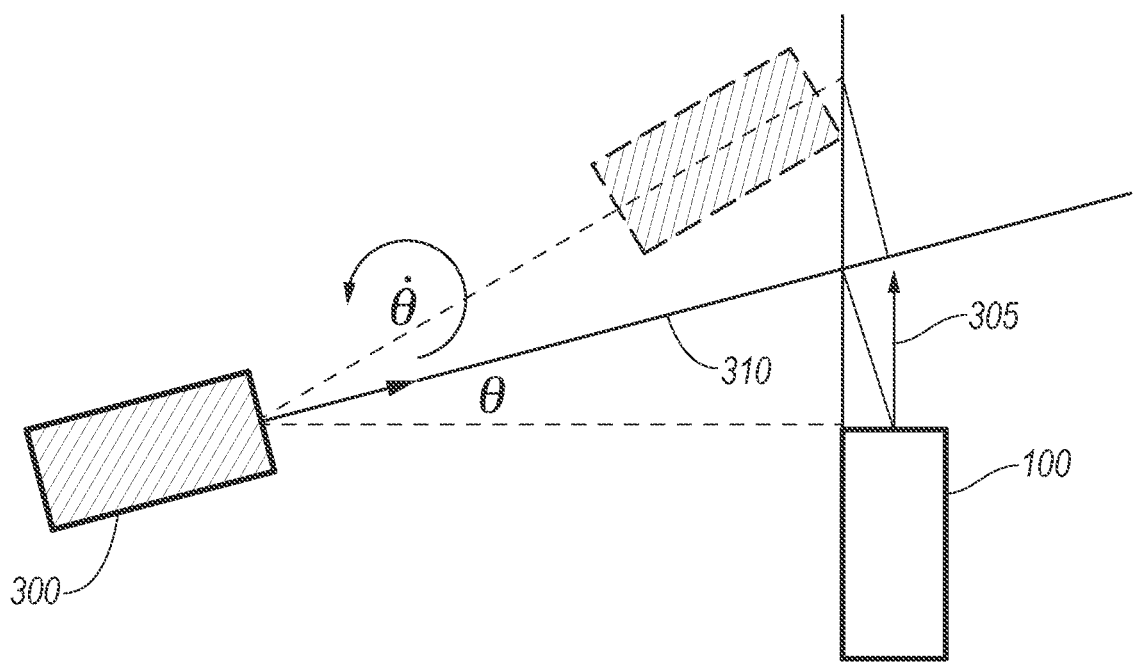
FIG. 5 is a diagrammatic top view of another example interaction between the host vehicle and the target vehicle.

With reference to FIG. 5, the computer 105 may be programmed to follow the steps of the example of FIG. 5 to determine the quantity characterizing the intersection of the host path 305 and the target path 310 in response to a forward trajectory of the target vehicle 300 intersecting the host path 305 and the target vehicle 300 turning. The target path 310 is thus curved. The host vehicle 100 may be traveling straight or may be presumed to be traveling straight. The quantity may be the adjusted distance of the host vehicle 100 from the target path 310 or the time for the host vehicle 100 to enter the target path 310, determined as described below.

The computer 105 is programmed to determine a distance between the host vehicle 100 and the target path 310 based on a rate of change of a relative heading angle between the host vehicle 100 and the target vehicle 300. First, the computer 105 may determine a distance between the target vehicle 300 and the host path 305. The distance between the target vehicle 300 and the host path 305 may be a sum of a lateral distance between the host vehicle 100 and the target vehicle 300 and the component of the width of the target vehicle 300 in the lateral direction from the host vehicle 100, minus half the width of the host vehicle 100, as in the following equation:

$$L_{hostPath} = L_{latToTarg} + \frac{W_{target}}{2}\sin\theta - \text{sign}(L_{latToTarg})\frac{W_{host}}{2}$$

in which $L_{hostPath}$ is the distance between the center of the target vehicle 300 and the host path 305. $L_{latToTarg}$ is the lateral distance between center of the host vehicle 100 and the target vehicle 300. $W_{target}$ is the width of the target vehicle 300, θ is the relative heading angle between the host vehicle 100 and the target vehicle 300, sign( ) is a function that returns the sign (positive or negative) of its argument, and $W_{host}$ is the width of the host vehicle 100.

Next, the computer 105 determines an adjustment to the distance of the host vehicle 100 from the target path 310 based on the rate of change of the relative heading angle θ. The adjustment may be a product of a time for the target vehicle 300 to laterally reach the host path 305 relative to the coordinate system of the host vehicle 100, the rate of change of the relative heading angle θ, and the distance $L_{hostPath}$ of the center of the target vehicle 300 from the host path 305, e.g., as in the following equation:

$$L_{targPathAdd} = t_{hostLat}\dot{\theta}L_{hostPath}$$

in which $L_{targPathAdd}$ is the adjustment and $t_{hostLat}$ is the time for the target vehicle 300 to laterally reach the host path 305 from the coordinate system of the host vehicle 100.

Next, the computer 105 determines the distance of the host vehicle 100 from the target path 310 adjusted by the adjustment, e.g., as in the following equation:

$$L_{targPathFinal} = \begin{cases} L_{targPath} + L_{targPathAdd} & L_{hostPath} \geq 0 \\ L_{targPath} - L_{targPathAdd} & L_{hostPath} < 0 \end{cases}$$

Finally, the computer 105 may determine a time for the host vehicle 100 to enter the target path 310 as a function of the adjusted distance $L_{targPathFinal}$ of the host vehicle 100 from the target path 310. The time for the host vehicle 100 to enter the target path 310 is thus based on the rate of change of the relative heading angle. For example, the time may be a function of the lateral velocity of the host vehicle 100 toward the target vehicle 300, the lateral acceleration of the host vehicle 100 toward the target vehicle 300, and the corrected distance $L_{targPathFinal}$, as represented by the following equation:

$$t_{hostEnter} = f(v_{latToTarg}, a_{latToTarg}, L_{targPathFinal})$$

in which $v_{latToTarg}$ is the relative lateral velocity of the host vehicle 100 toward the target vehicle 300 and $a_{latToTarg}$ is the lateral acceleration of the host vehicle 100 toward the target vehicle 300.

Figure 6:
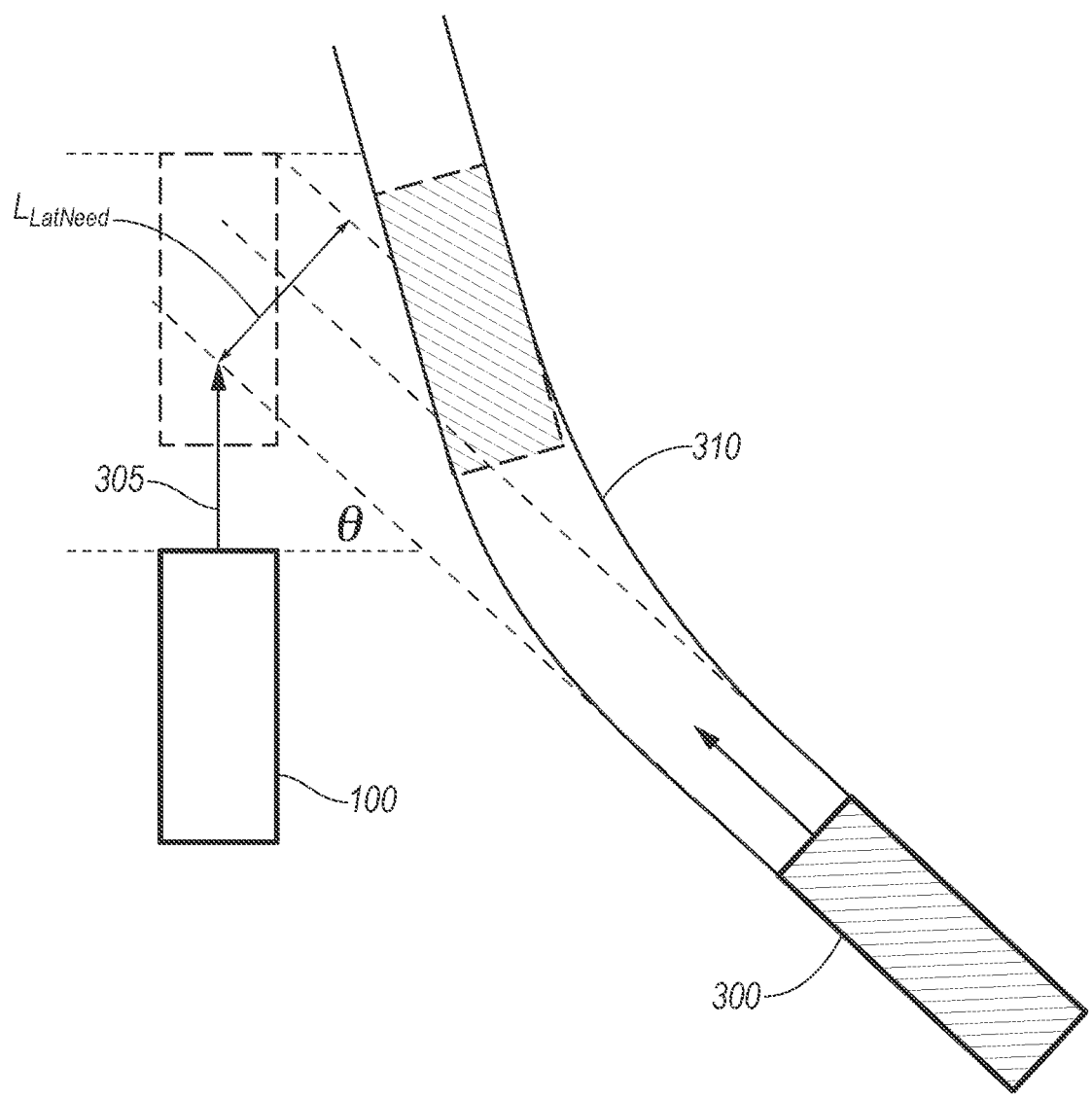
FIG. 6 is a diagrammatic top view of another example interaction between the host vehicle and the target vehicle.

With reference to FIG. 6, the computer 105 may be programmed to follow the steps of the example of FIG. 6 to determine the quantity characterizing the intersection of the host path 305 and the target path 310 in response to a forward trajectory of the target vehicle 300 intersecting the host path 305 and the target vehicle 300 turning. The target path 310 is thus curved. The host vehicle 100 may be traveling straight or turning. The steps below evaluate the ability of the target vehicle 300 to follow a curved target path 310 that is shifted from a straight target path. The target path 310 is thus curved. The quantity may be the lateral acceleration needed for the target vehicle 300 to follow the shifted target path 310 or the ratio of that lateral acceleration to a preset lateral acceleration, determined as described below.

The computer 105 is programmed to determine a lateral distance to shift the target path 310 from a straight-line path such that the target path 310 does not intersect the host path 305 at any point from a current position of the host vehicle 100 through a braking distance of the host vehicle 100. In other words, the target path 310 is shifted so as to only intersect the host path 305 at a point farther than the braking distance of the host vehicle 100 from the current position of the host vehicle 100. The lateral distance to shift may be measured from a reference point on the host vehicle 100 when located at the braking distance from the current position of the host vehicle 100. For example, the lateral distance may be given by the following equation:

$$L_{latNeed} = \max\left(\left(\frac{(v_{host} + a_{host}t_{latToTarg})^2}{2a_{host}} - L_{longToHost}\right) * |\sin\theta|, 0\right)$$

in which $L_{latNeed}$ is the lateral distance to shift the target path 310, $t_{latToTarg}$ is the time for the target vehicle 300 to laterally reach the host path 305, and $L_{longToHost}$ is the longitudinal distance relative to the target vehicle 300 for the target vehicle 300 to reach the host path 305.

The computer 105 may determine a lateral acceleration needed for the target vehicle 300 to follow the shifted target path 310, e.g., as in the following equation:

$$a_{latNeed} = \frac{2L_{latNeed}}{t_{latToTarg}^2}$$

The computer 105 may determine a ratio between the lateral acceleration $a_{latNeed}$ needed for the target vehicle 300 to follow the shifted target path 310 and a preset lateral acceleration, e.g., as in the following equation:

$$\text{ratio} = \frac{a_{latNeed}}{a_{latMax}}$$

in which $a_{latMax}$ is the preset lateral acceleration. The preset lateral acceleration $a_{latMax}$ may be chosen to represent a comfortable turn for the target vehicle 300. The preset lateral acceleration $a_{latMax}$ may be stored in the memory of the computer 105.

The computer 105 may be programmed to actuate a component of the vehicle based on the lateral distance to shift the target path 310. For example, the computer 105 may actuate the component in response to the ratio exceeding a threshold. The threshold may be chosen to indicate the target vehicle 300 being able to provide the needed lateral acceleration within a margin. The computer 105 may actuate the brake system 125 to slow the host vehicle 100 to a stop.

The computer 105 may be programmed to refrain from actuating the component based on the lateral distance to shift the target path 310 in response to a braking torque of the brake system 125 exceeding a threshold. In other words, if the host vehicle 100 is already braking at a brake torque above the threshold, the computer 105 does not use the ratio to determine whether to further actuate the brake system 125. The threshold may be chosen to indicate that an operator is intending to stop the host vehicle 100.

Figure 7:
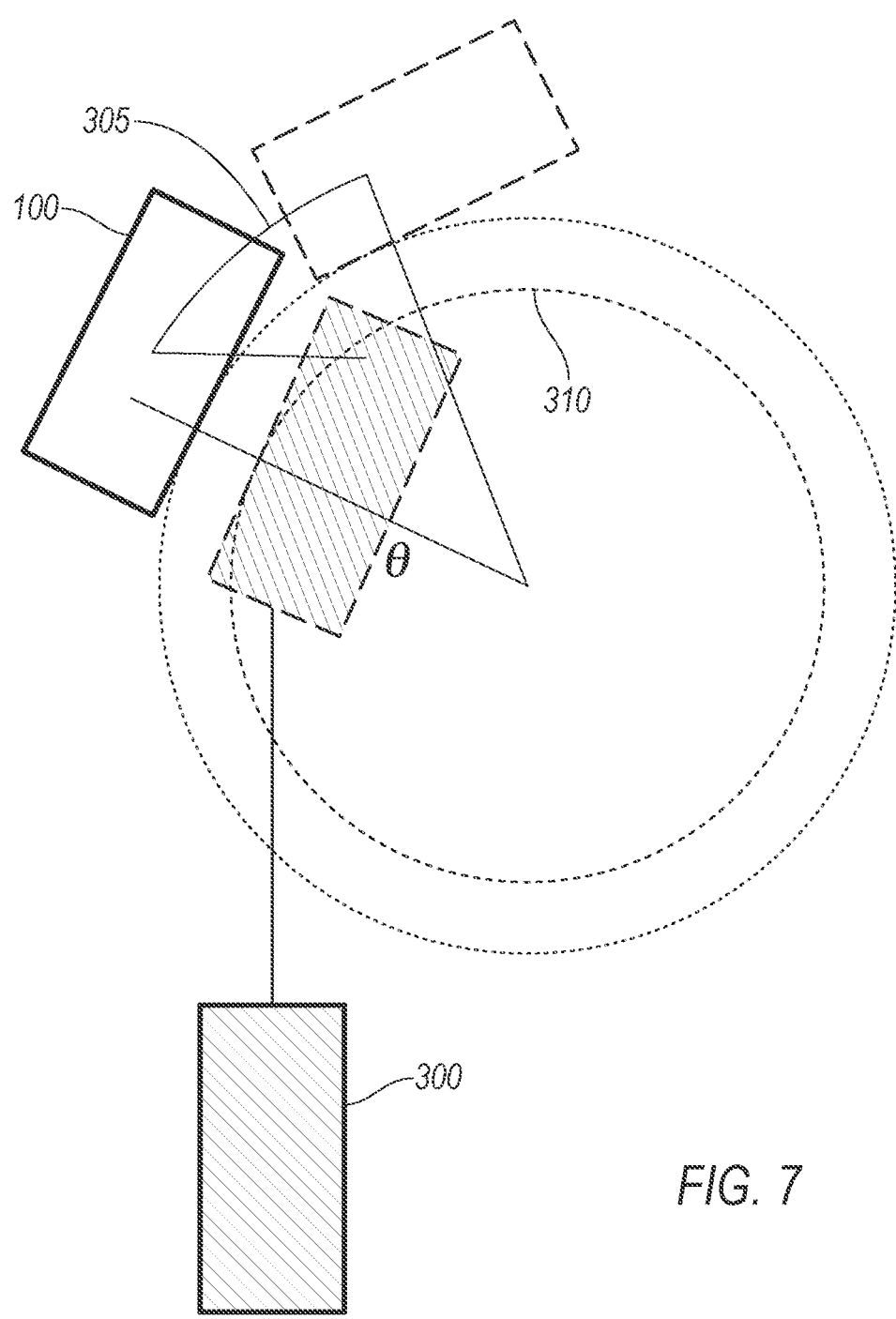
FIG. 7 is a diagrammatic top view of another example interaction between the host vehicle and the target vehicle.

With reference to FIG. 7, the computer 105 may be programmed to follow the steps of the example of FIG. 7 to determine the quantity characterizing the intersection of the host path 305 and the target path 310 in response to the host vehicle 100 turning and the target vehicle 300 approaching the host vehicle 100 from behind the host vehicle 100. The host path 305 is thus curved. The target vehicle 300 may be traveling straight or turning. The steps below evaluate the ability of the target vehicle 300 to follow a curved target path 310 inside the curved host path 305. The target path 310 is thus curved. The quantity may be a target yaw acceleration of the target vehicle 300, determined as described below.

The computer 105 may be programmed to determine whether the target vehicle 300 is decelerating. For example, the computer 105 may determine whether the acceleration of the target vehicle 300 is continuously below an acceleration threshold for at least a previous preset duration. The acceleration threshold is negative (indicating deceleration) and may be chosen to indicate active braking by the target vehicle 300, e.g., −1.5 m/s². The preset duration may be chosen to indicate an intent to slow the target vehicle 300 rather than typical fluctuations in speed when traveling at an intended positive speed, 200 milliseconds. The computer 105 may, upon determining that the target vehicle 300 is not decelerating, include an additional term for a reaction time by the target vehicle 300 when determining, e.g., the longitudinal distances or times for the target vehicle 300 to enter or exit the host path 305, such as in the examples above.

The computer 105 is programmed to determine a target yaw acceleration of the target vehicle 300. The target yaw acceleration may be a minimal yaw acceleration needed by the target vehicle 300 to turn inside of a turn by the host vehicle 100. The target yaw acceleration may be based on one or more of maintaining a minimum distance between the target vehicle 300 and the host path 305 (with the host path 305 having a radius of curvature), minimizing a difference between a host yaw rate of the host vehicle 100 and a target yaw rate of the target vehicle 300, and minimizing a difference between a host lateral acceleration of the host vehicle 100 and a target lateral acceleration of the target vehicle 300.

First, the computer 105 may determine a first target yaw rate of the target vehicle 300 that maintains a minimum distance between the target vehicle 300 and the host path 305 having the radius of curvature, e.g., as in the following equation:

$$\omega_{roc} = \frac{v_{target}}{R_{enter} * \text{sign}(\omega_{host}) - W_{target} - d_{min}}$$

in which $\omega_{roc}$ is the first target yaw rate and $d_{min}$ is the minimum distance. The radius of curvature $R_{enter}$ is determined as described above with respect to FIG. 3.

Next, the computer 105 may determine a second target yaw rate based on a relative lateral velocity between the host vehicle 100 and the target vehicle 300, i.e., of a difference in lateral velocities between the host vehicle 100 and the target vehicle 300, e.g., a quotient of the relative lateral velocity and a distance for the target vehicle 300 to enter the host path 305, e.g., as in the following equation:

$$\omega_{vlat} = \frac{v_{latToTarg}}{t_{targEnter} v_{target} * \text{sign}(L_{latToTarg})}$$

in which $\omega_{vlat}$ is the second target yaw rate.

Next, the computer 105 may determine a third target yaw rate that minimizes a difference between the host lateral acceleration of the host vehicle 100 and the target lateral acceleration of the target vehicle 300. For example, the third target yaw rate may be based on a quotient of a desired change in a target yaw rate of the target vehicle 300 and a time for the target vehicle 300 to enter the host path 305 following a straight line, e.g., as in the following equation:

$$\omega_{alat} = \frac{a_{latToTarg}}{v_{target} * \text{sign}(L_{latToTarg})} * k$$

in which $\omega_{alat}$ is the third target yaw rate, $a_{latToTarg}$ is the relative lateral acceleration of the host vehicle 100 toward the target vehicle 300, and k is a weight parameter between 0 and 1. The weight parameter k may be chosen based on a desired relative influence of the third target yaw rate when determining the total target yaw rate below.

Next, the computer 105 may determine a total target yaw rate based on the first yaw rate, the second yaw rate, and the third yaw rate. For example, the total target yaw rate may be a sum of the first yaw rate, the second yaw rate, and the third yaw rate, as in the following equation:

$$\omega_{tot} = \omega_{roc} + \omega_{vlat} + \omega_{alat}$$

in which $\omega_{tot}$ is the total target yaw rate. Finally, the computer 105 may determine the target yaw acceleration to change the actual target yaw rate to the total target yaw rate within the time until the target vehicle 300 crosses the host path 305, e.g., as in the following equation:

$$\dot\omega_{need} = \frac{\omega_{tot} - \omega_{target}}{t_{targEnter}}$$

in which $\dot\omega_{need}$ is the needed target yaw acceleration and $\omega_{target}$ is the current yaw rate of the target vehicle 300. The target yaw acceleration $\dot\omega_{need}$ is thus based on the inputs for the target yaw rates.

Alternatively, the computer 105 may determine the target yaw acceleration as a needed yaw acceleration for the target vehicle 300 to have the same yaw rate as the host vehicle 100 when the target vehicle 300 begins turning inside the host path 305. The computer 105 may determine the target yaw acceleration in this manner in response to a difference between the time for the target vehicle 300 to enter the host path 305 and the time for the host vehicle 100 to longitudinally reach the target path 310 is less than a preset threshold. The preset threshold may be chosen based on a typical reaction time. The target yaw acceleration may be based on a current host yaw acceleration, the time for the host vehicle 100 to longitudinally reach the target path 310, the current yaw rate of the target vehicle 300, and time for the target vehicle 300 to enter the host path 305, as in the following equation:

$$\dot\omega_{need} = \frac{\dot\omega_{host} * \frac{t_{hostEnter}}{2} - \omega_{target}}{t_{targEnter}}$$

The computer 105 may be programmed to compare the target yaw acceleration $\dot\omega_{need}$ to a threshold yaw acceleration $\dot\omega_{max}$. The threshold yaw acceleration $\dot\omega_{max}$ may be chosen to represent a comfortable entry into a turn. The computer 105 may actuate a component of the vehicle, e.g., the brake system 125, in response to the target yaw acceleration $\dot\omega_{need}$ exceeding the threshold yaw acceleration $\dot\omega_{max}$. The computer 105 may refrain from actuating the component in response to the target yaw acceleration $\dot\omega_{need}$ being below the threshold yaw acceleration $\dot\omega_{max}$.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
    determine a host kinematic state of a host vehicle;
    determine a target kinematic state of a target vehicle;
    determine a quantity characterizing an intersection of a host path of the host vehicle and a target path of the target vehicle, the host path being based on the host kinematic state, the target path being based on the target kinematic state, the host path being curved, the target path being curved, the quantity being a target yaw acceleration of the target vehicle; and
    actuate a component of the host vehicle based on the quantity.

2. The computer of claim 1, wherein the component includes at least one of a brake system and a steering system.

3. The computer of claim 1, wherein the host path and the target path are based only on the host kinematic state and target kinematic state.

4. The computer of claim 1, wherein the instructions further include instructions to determine a radius of curvature of the host path based on a rate of change of the radius of curvature.

5. The computer of claim 4, wherein the radius of curvature is a sum of an instantaneous radius of curvature and a term including the rate of change of the radius of curvature.

6. The computer of claim 5, wherein the instantaneous radius of curvature is a quotient of a velocity of the host vehicle and a yaw rate of the host vehicle.

7. The computer of claim 4, wherein the radius of curvature of the host path is based on a product of a prestored gain and the rate of change of the radius of curvature.

8. The computer of claim 1, wherein the instructions further include instructions to determine a radius of curvature of the host path, and determine a time for the target vehicle to enter the host path based on the radius of curvature.

9. The computer of claim 1, wherein the instructions further include instructions to determine a radius of curvature of the host path, and determine a time for the target vehicle to exit the host path based on the radius of curvature.

10. The computer of claim 1, wherein the instructions further include instructions to determine a distance from the host vehicle to the target path based on a rate of change of a relative heading angle between the host vehicle and the target vehicle.

11. The computer of claim 1, wherein the instructions further include instructions to determine a lateral distance to shift the target path from a straight-line path such that the target path does not intersect the host path from a current position of the host vehicle through a braking distance of the host vehicle.

12. The computer of claim 1, wherein the instructions further include instructions to determine the target yaw acceleration based on a radius of curvature of the host path.

13. The computer of claim 12, wherein the instructions further include instructions to determine a target yaw rate of the target vehicle that maintains a minimum distance between the target vehicle and the host path having the radius of curvature, and determine the target yaw acceleration based on the target yaw rate.

14. The computer of claim 1, wherein the instructions further include instructions to determine the target yaw acceleration based on a relative lateral velocity between the host vehicle and the target vehicle.

15. The computer of claim 1, wherein the instructions further include instructions to determine the target yaw acceleration based on a quotient of a desired change in a target yaw rate of the target vehicle and a time for the target vehicle to enter the host path following a straight line.

16. A method comprising:
    determining a host kinematic state of a host vehicle;
    determining a target kinematic state of a target vehicle;
    determining a quantity characterizing an intersection of a host path of the host vehicle and a target path of the target vehicle, the host path being based on the host kinematic state, the target path being based on the target kinematic state, the host path being curved, the target path being curved, the quantity being a target yaw acceleration of the target vehicle; and
    actuating a component of the host vehicle based on the quantity.

* * * * *